May 22, 1928.

F. GRÜNHUT ET AL 1,670,617

AUTOMATIC BRAKE DEVICE FOR TRAINS

Filed March 19, 1927

Inventors:

May 22, 1928.  F. GRÜNHUT ET AL  1,670,617

AUTOMATIC BRAKE DEVICE FOR TRAINS

Filed March 19, 1927  2 Sheets-Sheet 2

Inventors:
Friedrich Grünhut
Hans Nawach

Patented May 22, 1928.

1,670,617

UNITED STATES PATENT OFFICE.

FRIEDRICH GRÜNHUT AND FRANZ NOWACK, OF NUREMBERG, GERMANY; SAID NOWACK ASSIGNOR TO SAID GRÜNHUT.

AUTOMATIC BRAKE DEVICE FOR TRAINS.

Application filed March 19, 1927, Serial No. 176,760, and in Germany October 26, 1926.

The object of the present invention is a device for preventing railway accidents caused by disregard of stopping signals, a special feature of this device being that it fully complies with the official regulations by giving audible as well as optical cautionary signals to the responsible engineer, and that it further complies with the technical and service prescriptions, the required object being attained by most simple means; in particular, for instance, the electrification of the track is unnecessary.

The device according to the present invention is adapted to give the engineer on the locomotive when travelling audible as well as optical signals in case of any neglect or non-performance of his duties and to put on the brakes automatically in case these signals are not observed for one reason or another. Furthermore the device is so constructed as to allow itself to be adjusted for a predetermined time after the disregard of the signal, during which the application of the brakes is desired, independent of any operations on the part of the engineer, the predetermined period for the application of the brakes being set by a competent official by adjusting a time relay kept under lock and seal. Moreover the device is adapted to automatically record on time check clocks suitably connected with the system the disregard of a signal and also the moment of the application of the brakes. Furthermore pilot lamps and measuring mechanisms are suitably connected with the system in order to indicate that same is working properly.

Our invention is illustrated in the accompanying drawings wherein.

Figure 1:
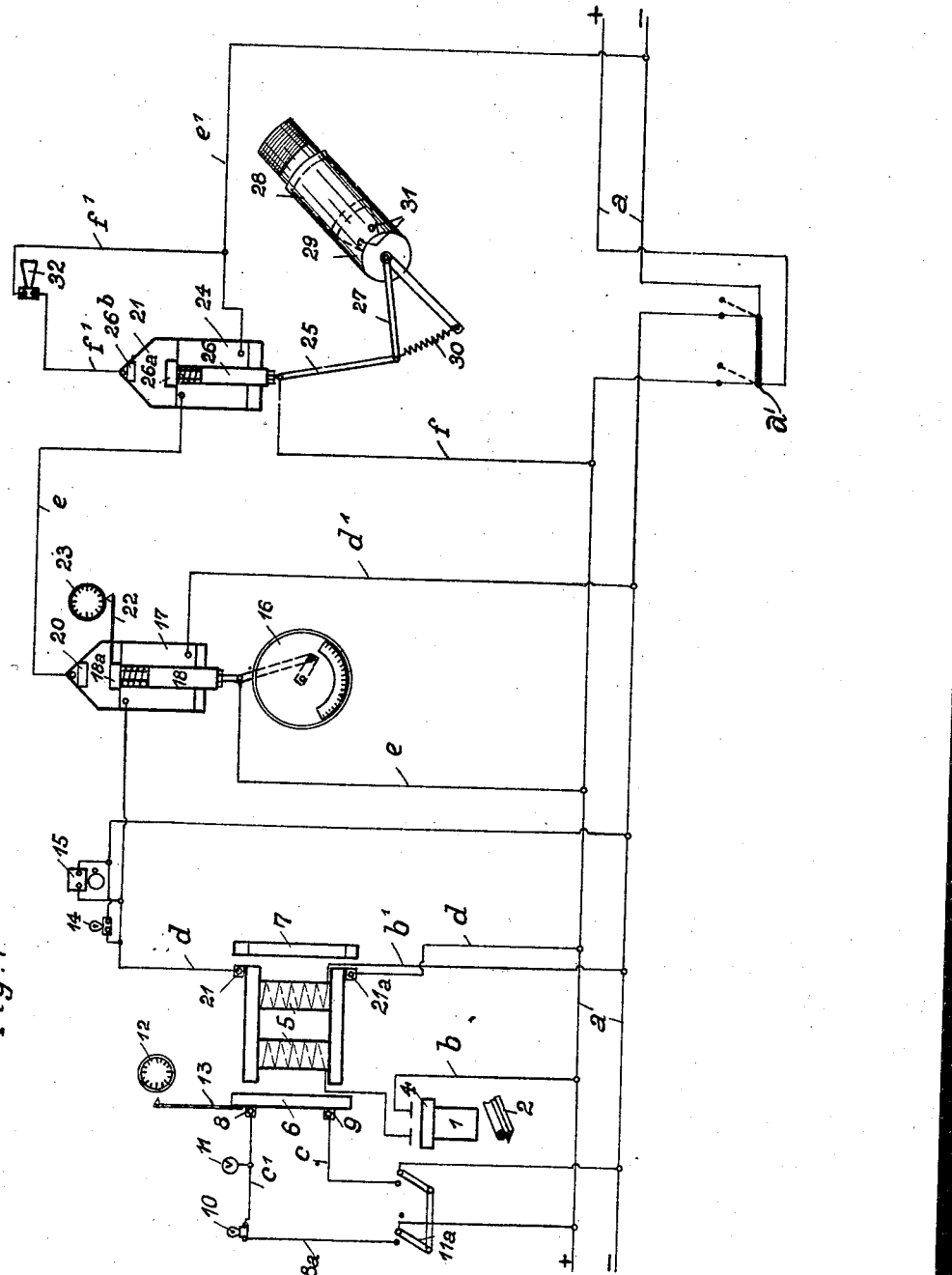
Fig. 1 shows a diagram of the arrangement of the automatic braking device.
Figure 2:
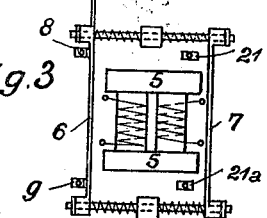
Fig. 2 shows the receiver and the cooperating shoe in longitudinal section and perspective elevation respectively.
Figure 3:
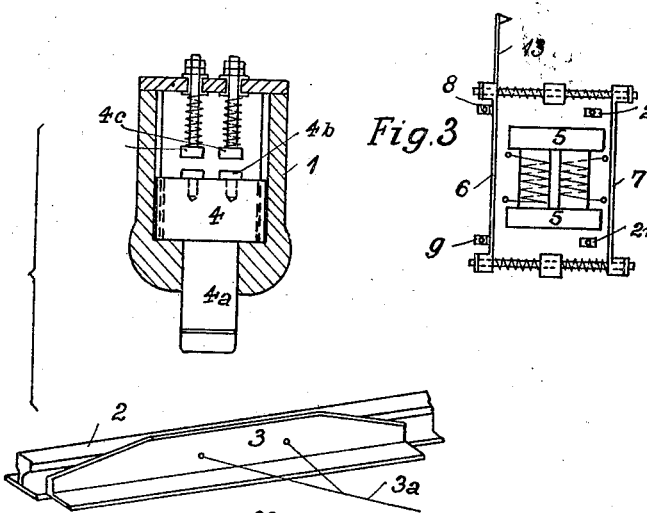
Fig. 3 illustrates the intermediate relay in a side elevation.
Figure 4:
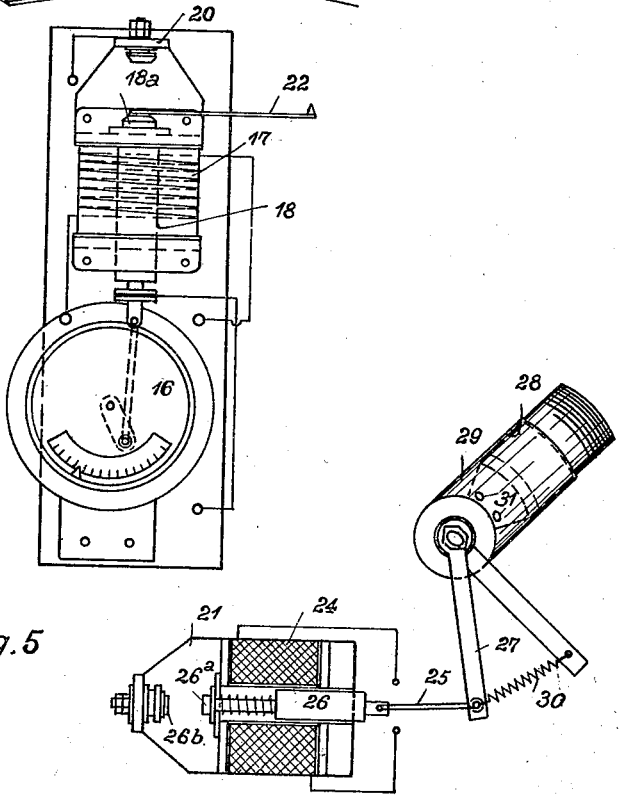
Fig. 4 illustrates the time relay in a side elevation.

The device is arranged according to the present invention on a switchboard placed in a suitable position on the cab of the locomotive, and adapted to be kept under lock and seal, so that it cannot be interfered with by the engineer. The operation of the different elements of the apparatus connected in circuit with each other by means of the wires $a$, fed by any kind of a suitable source of energy, is effected by a receiver 1 arranged on the lower frame structure of the locomotive. This receiver 1 (Fig. 2) consists of a case within which is movably mounted a contact plunger 4 having on its under side a projecting shaft $4^a$ and on its upper side two contacts $4^b$. Above these contacts are supported two contact bolts $4^c$ resiliently mounted by means of spiral springs and connected in circuit by means of the wires $b$, $b^1$, fed by the electrical source $a$. The track 2 is provided with a cooperating shoe 3 connected by means of rods $3^a$ with the track signal system, it being of no importance for the present invention, whether the cooperating shoes 3 are arranged rigidly or movably on the track. When passing a cooperating shoe the projecting shaft $4^a$ of the receiver is raised so that it abuts against the contact bolts $4^c$ closing thereby the circuit through the wires $b$, $b^1$. Interposed in the latter is an intermediate two-polar relay 5 which is provided on both its sides with two contact members 6 and 7 (Fig. 3), actuated as a result of the electrical connection established by the receiver 1. The member 6 is connected in its original position with the contacts 8 and 9, from which extends a wire $8^a$ having in its circuit a green pilot lamp 10 and a voltmeter 11, which serve for checking the proper working of the device and for measuring the strength of the current. This light and the voltmeter are controlled by a switch member $11^a$ disposed on the switchboard on the cab of the locomotive and indicate the proper working of the device and the discharge of the electrical source $a$. By means of the contact member 6 controlled by the receiver 1 a connection is effected, by means of a rod 13, to a turnable dial plate of a check block mechanism 12, whereby the time is indicated, when the intermediate relay is energized and the contact member 6 moved. By establishing an electrical connection, the current is caused to pass through the wire $b$ and to energize the intermediate relay 5 whereby the two contact members 6 and 7 are attracted. From the contact member 7 in circuit closing position a circuit extends over contacts 21 through the wires $d$, $d^1$ to a time relay 16 (Fig. 4) consisting of a magnetic coil 17, in which a plunger 18 is movably guided. The latter is connected in the well-known manner with the check clock mechanism of the time relay and leads the current flowing through the wire $e$ to its contact point $18^a$, whilst the coil receives the current through the wires $d$ and $d^1$. In the wire $d$ extending from the contact 21 a red light 14 as well as a bell 15 are interposed, which represent the visible and the audible cautionary signals. The time relay 16 is constructed so as to be adjusted with reference to the duration of the raising of the plunger contact 18, for which purpose an adjustable dial plate is provided. The plunger 18 carries a rod 22 leading to a turnable dial plate of a check clock mechanism 23, whereby the time is indicated on the dial plate of the clock by the raising of the plunger.

Figure 5:
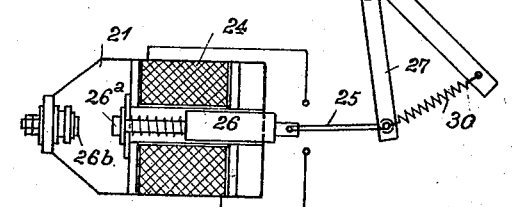
Fig. 5 shows the brake relay with the connection to the brake main piping in side elevation.

The relay 21 (Fig. 5) consists of a magnetic coil 24, which is energized on the one hand through the wire $e$ and on the other hand through a wire $e^1$ leading the current to the coil. Within the coil is situated a contact plunger 26, which is on the one side connected to the wire $f$ and on the other side provided with a contact member $26^a$. The latter is adapted to abut against a further contact $26^b$ fed through a wire $f^1$, in which is located a cautionary siren 32 and which is connected with the wire $e^1$. A lever 27 actuating a piston 28 arranged movably within a cylinder 29 is connected by rod 25 with the movable contact plunger 26. Said cylinder 29 is in connection with the main piping of the brake system, and a spring 30 returns the lever 27 into its original position after being actuated. The cylinder wall and the piston 28 are provided with openings 31 registering with each other when the piston is operated by 25, whereby the air in the main brake piping escapes, so that the brakes of the train are applied. When the contact plunger 26 is raised the circuit through $e'$, $f$, $f'$, is closed and the siren 32 put into action, thus indicating the moment of braking of the train.

The operation of the described device is as follows:

The engineer moves the switch member $11^a$ into such a position, that the circuit is closed through the wire $8^a$ in circuit with which is the check light 10 (green light) and the voltmeter 11, by means of which the proper working of the device is ascertained. When the train is in motion and passes a track signal which is in stopping position, the shaft $4^a$ of the receiver 1 is raised owing to the cooperating shoe 3 connected with the track signal by means of rod $3^a$, and the current flows from the wire $a$ to the intermediate relay 5. Owing to the circuit established by means of the wires $b$, $b^1$ the two contact members 6 and 7 are attracted. Thereby the circuit through the contacts 8 and 9, till now connected with the contact member 6, is broken, and the green light with the voltmeter are cut out. At the same time the signal check clock mechanism 12 is actuated by means of the rod 13 connected with the contact member 6, so that the moment is recorded in which the train passes over the cooperating shoe 3. The contact member 7 closes at the same time the circuit in the wire $d$ connected to the visible and audible signals 14 and 15, and via wired the current is led to the magnetic coil 17 of the time relay 16, which is adjusted to maintain its plunger 18 raised for a predetermined time, after which the plunger 18 will be released. The time adjustment for the operation of 16 is well known hitherto and the details of the element in question does not form part of the present invention. When coil 17 is energized the movable contact plunger 18 is raised and abuts against the contact 20 leading the current through the wire $e$ to the brake relay 24. At the same time the brake check clock mechanism 23 is actuated, recording the moment of closing of the circuit of the brake relay 24. By the energizing of the coil of the relay 24 the contact plunger 26 is raised and abuts against a contact $26^b$, closing thereby the circuit through the wires $f$ and $f^1$ connected to the siren 32 and thus putting the latter in operation. At the same time the piston 28 is turned owing to the connection formed by the lever 27 with the piston 28, till the openings in the cylinder 29 and the piston register with each other and the brakes are put on. After the engineer has broken the circuit through 24 by means of any suitable switch member $a'$ interposed in the wires $a$ the lever 27 returns into its original position owing to its being under action of the spring 30, and the device is ready for the next application of the brakes.

In case the cooperating shoe 3 acting on the receiver is rigidly connected with the track (such rigid connecting shoes being provided on stretches of the track where it is difficult to ensure the proper working of the railway signal system), the engineer will naturally, after passing such cooperating shoe and on hearing the cautionary signals and seeing the lamp 14 light, prevent the braking action by operating said switch member $a'$ interposed in the circuit in any suitable position. When paying proper attention to the ordinary signals, even the preliminary cautionary signals can be avoided by cutting out the device in time.

The described invention can be used also for electric railways, in which case the train carried source of current may be omitted. Furthermore the construction of the apparatus and mechanisms employed in the present invention can be altered according to requirements.

What we claim is:

1. An automatic brake device for trains, comprising in combination a receiver having contacts establishing a circuit on the locomotive; a two-polar intermediate relay interposed in the circuit of the said receiver; contact members on both sides of the said intermediate relay and adapted to be actuated as a result of the electrical connecton established by the said receiver; two contacts connected on the one side in their original position with one of the contact members of the intermediate relay; wires extending from said contacts; means interposed in the said wires and adapted to serve for checking and measuring the device and its circuit; means for indicating the operaton of the intermediate relay; two contacts on the other side of the said intermediate relay and actuated by the other of the contact members of the latter; wires extending from said contacts; and means interposed in the circuit of the said wires leading the current from these contacts and adapted to operate the brakes of the train.

2. An automatic brake device for trains, comprising in combination a receiver establishing a circuit on the locomotive; a two-polar intermediate relay interposed in the circuit of the said receiver; contact members on both sides of the said intermediate relay; two contacts connected on the one side with one of the contact members of the said intermediate relay; wires extending from said contacts and having in their circuit a pilot lamp and a voltmeter; a switch member in the said wires adapted to break the circuit; a check clock mechanism having a turnable dial plate; a connecting means between the said one contact member and the dial plate of the said clock mechanism adapted to indicate the operation of the intermediate relay; two contacts on the other side of the said intermediate relay; and wires extending from said contacts; means interposed in the circuit of the said wires leading the current from these contacts and adapted to operate the brakes of the train.

3. An automatic brake device for trains, comprising in combination a receiver establishing a circuit on the locomotive; an intermediate relay actuated by the said receiver; contacts on the side of the intermediate relay; a wire extending from one of the said contacts; a time relay interposed in the said wire; an audible and a visible cautionary signal interposed in the said wire; a magnetic coil connected with the said time relay and energized through said wire; a contact plunger guided in the magnetic coil; a contact arranged opposite to the contact plunger; a check clock mechanism having a turnable dial plate and adapted to indicate the operation of the time relay; a connecting means between the said contact plunger and the said check clock mechanism; a wire leading the current from the opposite contact of the time relay; and means interposed in the said wire and adapted to operate the brakes of the train.

4. An automatic brake device for trains, comprising in combination a receiver establishing a circuit on the locomotive; an intermediate relay actuated by the said receiver; contacts on the side of the intermediate relay; a wire extending from one of the said contacts; a time relay interposed in the said wire; a wire extending from the said time relay; a brake relay interposed in the said wire; a magnetic coil arranged in the said relay; a contact plunger guided in the said magnetic coil; an opposite contact disposed above said contact plunger; a wire extending from said opposite contact; a cautionary siren interposed in the said wire; and means connected with the said plunger and adapted to operate the brakes of the train.

5. An automatic brake device for trains, comprising in combination a receiver establishing a circuit on the locomotive; an intermediate relay actuated by the said receiver; contacts on the side of the intermediate relay; a wire extending from one of the said contacts; a time relay interposed in the said wire; a wire extending from the said time relay; a brake relay interposed in the said wire; a magnetic coil arranged in the said relay; a contact plunger guided in the said magnetic coil; a cylinder connected with the main piping of the brake system; a piston arranged turnably within the said cylinder; openings in the cylinder and in the piston adapted to be registered with each other; a lever arranged on the piston; a rod connecting the said lever with the plunger of the said relay; and a spring engaging with the said lever and adapted to return the latter into its original position.

In testimony whereof we affix our signatures.

FRIEDRICH GRÜNHUT.
FRANZ NOWACK.